United States Patent
Criado Del Pino et al.

(10) Patent No.: US 11,692,567 B2
(45) Date of Patent: Jul. 4, 2023

(54) FASTENER

(71) Applicant: ILLINOIS TOOL WORKS INC., Glenview, IL (US)

(72) Inventors: Francisco Criado Del Pino, Cerdanyola del Valles (ES); Francisco Cuervas Florido, Rubi (ES); Ivan Cipres Ballester, Braunschweig (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 62 days.

(21) Appl. No.: 17/333,841

(22) Filed: May 28, 2021

(65) Prior Publication Data
US 2021/0381536 A1    Dec. 9, 2021

(30) Foreign Application Priority Data

Jun. 3, 2020 (EP) .................................... 20178073
Jun. 17, 2020 (EP) .................................... 20180606
May 5, 2021 (EP) .................................... 21172266

(51) Int. Cl.
*F16B 21/00* (2006.01)
*F16B 5/06* (2006.01)
*F16B 21/02* (2006.01)

(52) U.S. Cl.
CPC .......... *F16B 5/0628* (2013.01); *F16B 5/0657* (2013.01); *F16B 21/02* (2013.01)

(58) Field of Classification Search
CPC ....... F16B 5/0628; F16B 5/0657; F16B 21/02
See application file for complete search history.

(56) References Cited

U.S. PATENT DOCUMENTS

| | | | | |
|---|---|---|---|---|
| 4,400,856 A | * | 8/1983 | Tseng ........................ | B60P 7/13 403/348 |
| 4,422,222 A | * | 12/1983 | Notoya ................. | F16B 21/082 24/453 |
| 4,527,760 A | * | 7/1985 | Salacuse ................. | F16B 21/02 248/108 |
| 4,840,523 A | * | 6/1989 | Oshida ................ | F16B 19/1081 411/908 |
| 4,952,106 A | * | 8/1990 | Kubogochi ......... | F16B 19/1081 411/48 |
| 5,448,804 A | * | 9/1995 | Warren ................... | F16B 5/126 24/297 |
| 5,592,719 A | * | 1/1997 | Eto ........................ | F16B 21/086 D8/382 |
| 5,604,958 A | * | 2/1997 | Anscher .................... | A45F 3/04 24/165 |

(Continued)

FOREIGN PATENT DOCUMENTS

FR         2561325 A3    9/1985

*Primary Examiner* — Jason W San
(74) *Attorney, Agent, or Firm* — Thompson Hine LLP (57) ABSTRACT

A fastener, for fixing a sheet component, includes a body with a pair of resiliently deformable arms arranged to extend through an opening in the sheet component during use, and a pin rotatably mounted within the body and including a pair of locking legs, the pin being rotatable between: (i) an unlocked position, in which the retaining arms are deformable to pass through the opening in the sheet component, and (ii) a locked position, in which the locking legs engage the retaining arms to restrict deformation of the retaining arms and secure the fastener to the sheet component.

7 Claims, 7 Drawing Sheets

(56) References Cited

U.S. PATENT DOCUMENTS

| | | | |
|---|---|---|---|
| 5,718,549 A * | 2/1998 | Noda | F16B 5/0657 411/553 |
| 5,975,820 A * | 11/1999 | Kirchen | F16B 19/1081 411/908 |
| 6,196,756 B1 | 3/2001 | Leverger | |
| 6,305,588 B1 * | 10/2001 | Michel | A45F 5/02 455/100 |
| 6,332,281 B1 * | 12/2001 | Savoie | A43C 15/161 36/114 |
| 6,594,870 B1 * | 7/2003 | Lambrecht | F16B 5/0628 24/453 |
| 6,612,795 B2 * | 9/2003 | Kirchen | F16B 21/086 24/297 |
| 6,929,226 B1 * | 8/2005 | Philistine | F16B 21/02 248/222.12 |
| 6,955,515 B2 * | 10/2005 | Barina | F16B 21/02 411/509 |
| 7,017,239 B2 * | 3/2006 | Kurily | F16B 21/086 24/453 |
| 7,073,231 B2 * | 7/2006 | Draggoo | F16B 21/082 24/453 |
| 7,748,089 B2 * | 7/2010 | Jalbert | F16B 25/00 24/297 |
| 8,585,121 B2 * | 11/2013 | Marx | F16B 21/02 24/297 |
| 8,851,551 B1 * | 10/2014 | Kaufman | F16B 19/00 24/297 |
| 8,997,316 B2 * | 4/2015 | Loewe | F16B 21/075 24/297 |
| 9,938,997 B2 * | 4/2018 | Iwahara | F16B 5/0664 |
| 9,982,699 B2 * | 5/2018 | Risdale | F16B 21/02 |
| 2006/0207072 A1 * | 9/2006 | Chen | A44B 11/2588 24/590.1 |
| 2012/0073089 A1 * | 3/2012 | Buillas | F16B 21/02 24/293 |
| 2012/0240363 A1 * | 9/2012 | Lee | B60R 13/02 24/297 |
| 2014/0255089 A1 * | 9/2014 | Courtin | F16B 5/10 403/326 |
| 2016/0316900 A1 * | 11/2016 | Hanchett | A45F 5/02 |
| 2020/0116185 A1 * | 4/2020 | Kolb | F16B 21/086 |
| 2020/0391675 A1 * | 12/2020 | Wang | F16B 5/0664 |
| 2021/0010500 A1 * | 1/2021 | Rassam | F16B 5/0657 |

* cited by examiner

FASTENER

TECHNICAL FIELD OF INVENTION

The invention relates to a fastener system for coupling two structures, such as, for example, a plastic panel and a metal sheet. In particular, the present invention provides for a fastening solution for plastic panel(s) with a metal sheet (e.g. with a wide range in thickness of 0.7 mm to 2.0 mm), therefore, allowing a pre-assembly function of the plastic panel with relatively large tolerances in both axes (e.g. +/−1.0 mm) so as to minimise required space, assembly weight, as well as, the time needed for the final assembly with the metal sheet.

BACKGROUND

A rivet or scrivet may be used to fix a plastic panel to a metal sheet. However, such fasteners require assembly at the time of fixing the plastic panel to the metal sheet because of the need to position the rivet or scrivet through the two components and then fasten it (i.e. extract the pin from the rivet or wind the screw into the scrivet). In addition, a rivet or scrivet requires space if it were pre-assembled to one of the components, and in such a case, there is a risk of the rivet or scrivet breaking before it is fixed to the other component.

Other known fasteners for fixing a plastic panel to a metal sheet include screwing solutions such as an expanding grommet. The expanding grommet may be pre-fixed (i.e. pre-installed) on the metal sheet or on the plastic panel. However, the tolerance ranges can be limited, and a metal screw is typically required to complete fixation, consequently, resulting in higher weight and assembly time.

SUMMARY

According to the present invention, there is provided a fastener for fixing a sheet component, the fastener comprising: a body comprising a pair of resiliently deformable arms arranged to extend through an opening in the sheet component during use, and a pin rotatably mounted within the body and comprising a pair of locking legs, the pin being rotatable between an unlocked position in which the retaining arms are deformable to pass through the opening in the sheet component, and a locked position in which the locking legs engage the retaining arms to restrict deformation of the retaining arms and secure the fastener to the sheet component.

Each of the retaining arms may comprise a rib having a slot formed thereon. The slot may be configured to receive a respective locking leg of the pin upon rotation of the pin to the locked position.

The head may be configured to be attached to a further sheet component such that the fastener is for fixing the sheet component to the further sheet component. For example, the body may further comprise a head portion and a tab axially spaced from the head portion such that a portion of the further sheet component is receivable between the head portion and the tab to attach the fastener to the further sheet component. In some examples, the tab is shaped such that the tab can pass through a shaped opening in the further sheet component and the body is rotatable to move the portion of the further sheet component between the head portion and the tab. The tab may be substantially square, and the opening in the further sheet component may be substantially square. The further sheet component may comprise a recess extending from the opening to receive the tab.

Accordingly, the fastener can be pre-assembled with the further sheet component by attaching the body to the further sheet component using the tab. The pre-assembly can then be attached to the sheet component by passing the retaining arms through an opening of the sheet component and rotating the pin.

The body may comprise a hole having a first cross-sectional profile. The locking legs may define a second cross-sectional profile corresponding to the first cross-sectional profile. In the unlocked position, the locking legs may be able to pass through the hole such that the pin is separable from the body. This advantageously allows the body to be mounted to the further sheet component independently of the pin. By providing a separable fastener, the retaining arms of the body may be pressed through a hole formed in the further sheet material by deforming as it passes through the hole, and snap back into position once secured to the further sheet component.

The pin may comprise at least one knob arranged to engage with the body when the pin is in the unlocked position, so as to retain the pin within the body in the unlocked position. Thus, the pin can be secured to the body after the body is secured to the further sheet component by passing the pin through the hole in the body and by pressing the pin into position.

In another example, the present invention provides a sheet component comprising a fastener as described above, the fastener being secured to the sheet component.

In another example, a pre-assembled sheet is provided. The pre-assembled sheet comprises a sheet component having a hole formed therein, a fastener comprising a body having a head portion and a tab, the tab being arranged to pass through the hole such that a portion of the sheet component is disposed between the head portion and the tab upon rotation of the body within the hole. The fastener is secured to the sheet component due to the contour and shape of the hole in the sheet component and the corresponding shape of the head portion and the tab of the fastener. Preferably, the fastener is secured to the sheet component upon rotation of the body by approximately 45 degrees within the hole.

BRIEF DESCRIPTION OF DRAWINGS

Example embodiment(s) of the invention are illustrated in the accompanying drawings, in which.

DESCRIPTION

The described example embodiment relates to a fastener assembly for use with vehicle components, and particularly, a fastener assembly for fixing sheet components. However, the invention is not limited for use with vehicle components but may be used for any suitable fastening.

Certain terminology is used in the following description for convenience only and is not limiting. The words 'right', 'left', 'lower', 'upper', 'front', 'rear', 'upward', 'down', 'downward', 'above' and 'below' designate directions in the drawings to which reference is made and are with respect to the described component when assembled and mounted (e.g. in situ). The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Through the description and claims of this specification, the terms 'comprise' and 'contain', and variations thereof, are interpreted to mean 'including but not limited to', and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality, as well as, singularity, unless the context requires otherwise.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract or drawings), or to any novel one, or any novel combination, of the steps of any method or process so disclosed.

Figure 1A:
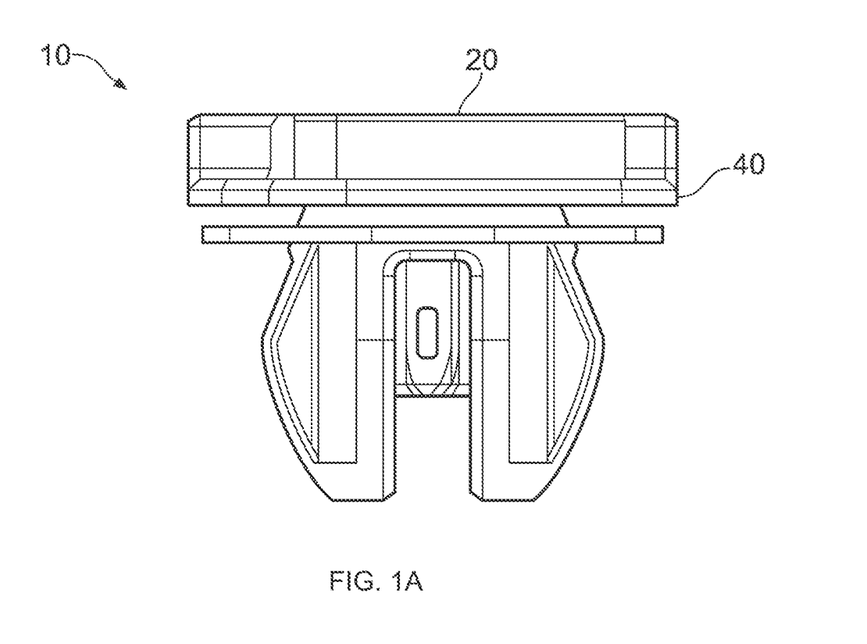
FIGS. 1A-1B illustrate an example embodiment of the rivet fastener assembly of the present invention FIG. 1A side view, and FIG. 1B cross-sectional side view when in use, i.e. coupling a plastic panel and metal sheet.
Figure 1B:
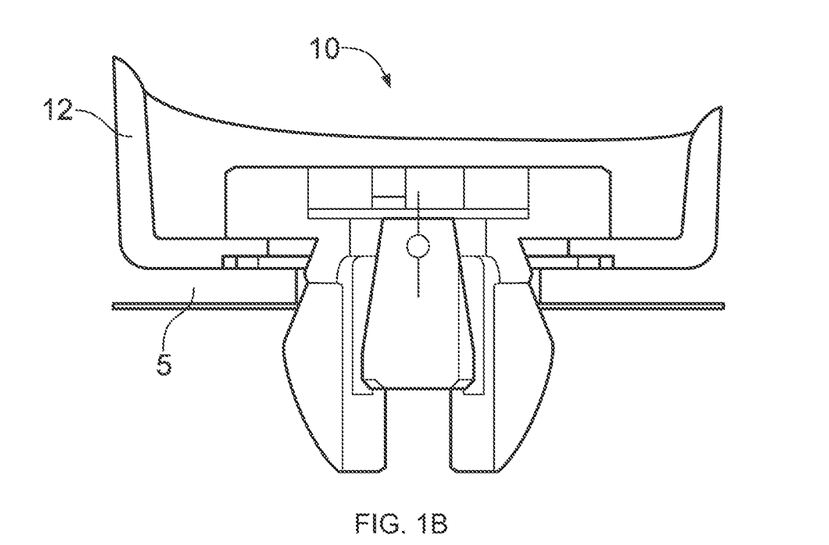
Figure 2A:
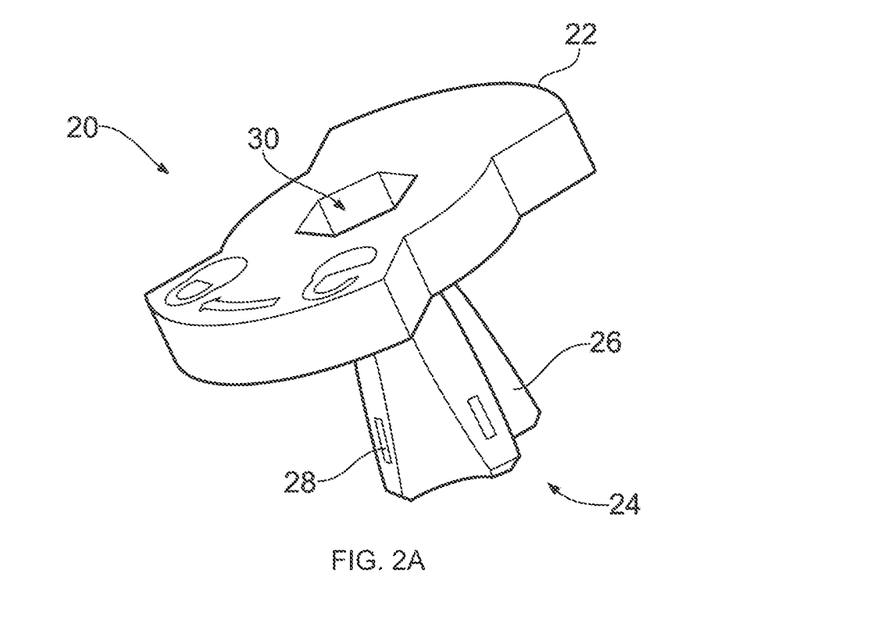
FIGS. 2A-2C illustrate the locking element (i.e. pin) of the rivet fastener assembly of FIG. 1A-1B in FIG. 2A a perspective view, FIG. 2B a front view and FIG. 2C a top view.
Figure 2B:
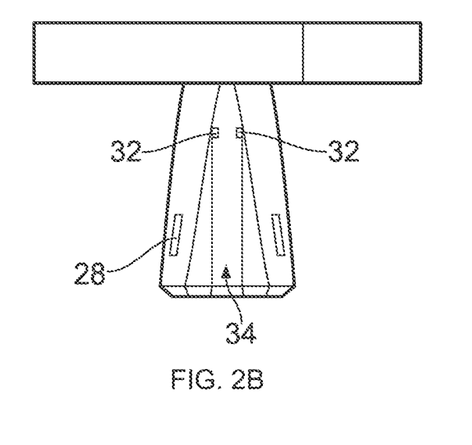
Figure 2C:
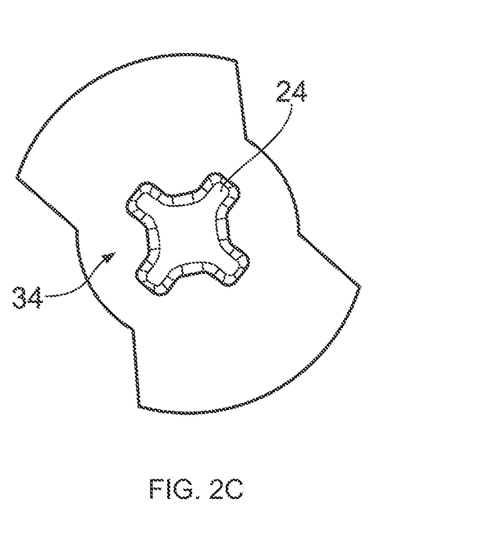

As shown in FIGS. 1A-1B, a fastener assembly 10 is formed of a pin 20 and a body 40 that can selectively secure a plastic panel 12 to a metal sheet 5. One example of a pin 20 of the fastener assembly 10 is illustrated in FIGS. 2A-2C. The pin 20 comprises a head 22 having a hole or aperture 30 for receiving a suitable tool (not shown) to rotate the pin and lock or unlock the fastener assembly 10. The hole 30 may partially or completely pass through the depth of the head 22. Whilst the illustrated hole 30 has a hexagonal profile, it would be apparent that this is not essential and that other profiles for corresponding tools would be suitable for use with the present fastener assembly 10. The tool simply allows a user to rotate the pin 20 within the body 40 to lock or unlock the fastener assembly 10.

The pin 20 further comprises an elongate portion 24 extending away from the head 22 along a longitudinal axis, the elongate portion 24 has four locking legs 26 extending away from the longitudinal axis in a direction substantially perpendicular direction to the longitudinal axis (e.g. centre axis of the pin 20). Each one of the locking legs 26 may comprise a ridge 28 formed thereon and which is configured to engage with a corresponding recess or slot 58 on the body 40 (see FIGS. 3A-3C) when the fastener assembly 10 is in the locked configuration. While the illustrated ridges 28 are formed as straight ridges, it would be apparent this was not essential and that other profiles would be suitable for use with the present fastener assembly 10. While the ridges 28 are illustrated adjacent a distal end of the elongate portion 24 it would be apparent this was not essential and the ridges 28 may be located at different positions and at different lengths along the abutment of locking legs 26.

The four locking legs 26 extend in mutually (radially) perpendicular directions to one another so as to define a substantially cross-shaped cross sectional profile of the elongate portion 24. While four locking legs 26 are shown, it would be apparent that this was not essential and more or fewer than four locking legs 26 would be suitable for use with the present fastener assembly 10. Furthermore, while in some cases it is desirable for the fastener assembly 10 to have an equal number of locking legs 26 to retaining arms 46, this was not essential. The elongate portion 24 is also illustrated as having a tapered profile such that the cross sectional area of the elongate portion 24 increases when extending away from the head 22 of the pin 20. Adjacent pairs of locking legs 26 define a longitudinal recess 34, within which are located a pair of knobs 32 that are arranged so as to retain the pin 20 within the body 40 when the fastener assembly 10 is in the unlocked position.

Figure 3A:
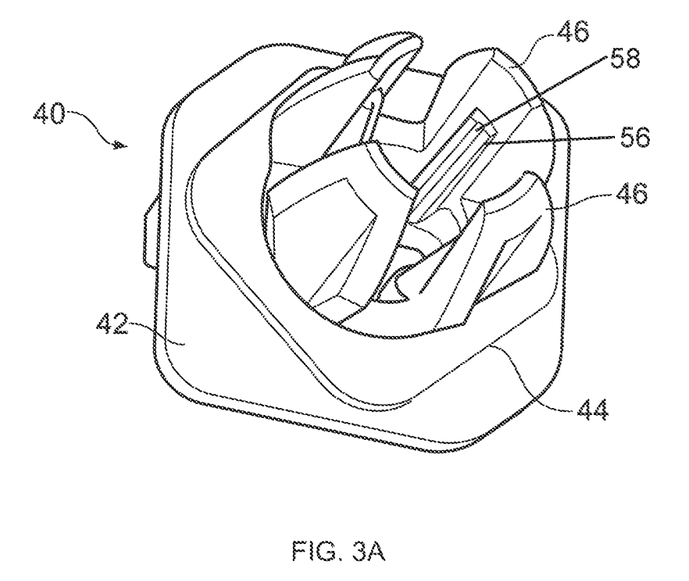
FIGS. 3A-3C illustrate the rivet retainer element of the rivet fastener assembly of FIGS. 1A-1B in FIG. 3A a perspective view, FIG. 3B a front view and FIG. 3C a cross-sectional view.
Figure 3B:
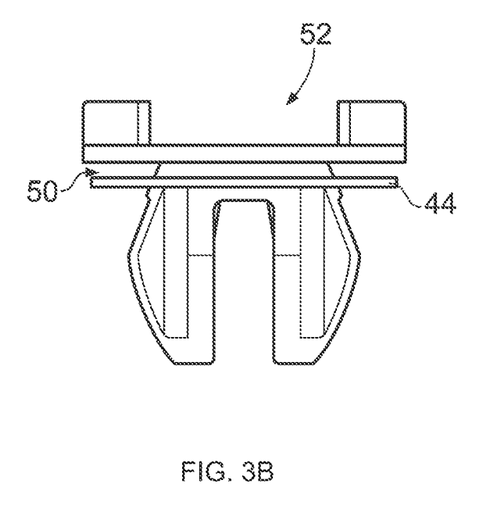
Figure 3C:
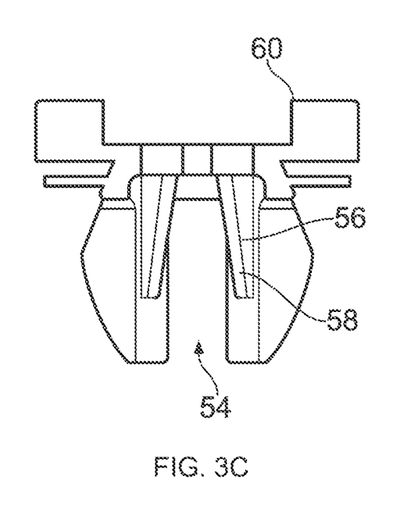

FIGS. 3A-3C illustrate an exemplary body 40 for use with the present fastener assembly 10. The body 40 has a head portion 42, an intermediate plate 44 and four arms 46 extending away from the head portion 42 in a direction parallel to a central longitudinal axis of the body 40. The head portion 42 has a central recess 52 for receiving the head 22 of the pin 20 when the fastener assembly 10 is assembled. A recess or space 50 is defined between the head portion 42 of the body 40 and the intermediate plate 44 which is for receiving a portion of a first panel 12. Each arm 46 is shown having an internal surface having a rib 56 disposed thereon. Each rib 56 is shown extending in a direction substantially parallel to that of the respective retaining arm 46, but it would be apparent this was not essential. Each rib 56 is also shown having a recess or slot 58 formed therein. As described above, the recess or slot 58 is configured to receive the corresponding ridge 28 formed on the abutment of the elongate portion 24 of the pin 20 to lock the fastener assembly 10 when in the locked configuration. The retaining arms 46 are also illustrated as pairs of opposed retaining arms arranged in a cross configuration that define a cavity 54 for receiving the elongate portion 24 of the pin 20. The resilient retaining arms 46 are adapted to resiliently deform towards and away from the central axis (so as to provide a bias back towards its undeformed position). This allows the retaining arms 46 to secure the pin 20 in place when the locking legs 26 engage with the retaining arms 46, i.e. pushing the retaining arms 46 away from the central axis and creating a bias back towards the central axis. In the locked configuration, the retaining arms 46 are abuttingly engaged with the corresponding ridges 28 preventing the retaining arms 46 from flexing (deforming) towards the central axis, which ensures the metal plate 5 remains clamped to the panel 12 (i.e. it cannot slide past the resilient retaining arms 46).

Figure 4A:
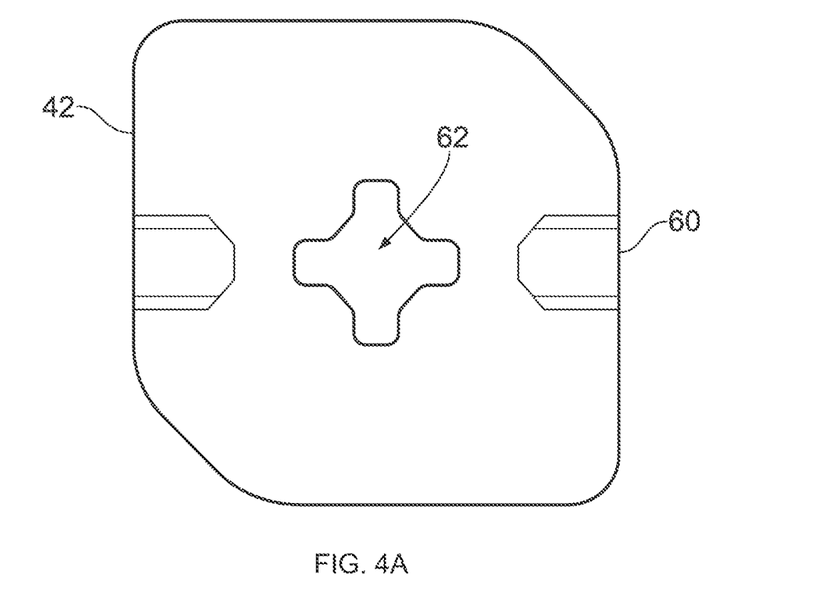
FIGS. 4A-4B illustrate the rivet retainer element in FIG. 4A a top view and FIG. 4B a bottom view.
Figure 4B:
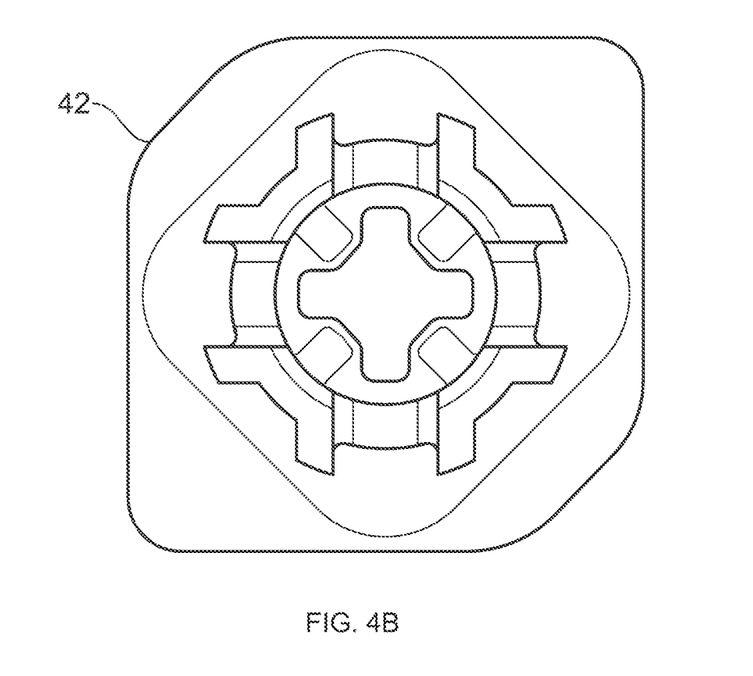
Figure 7A:
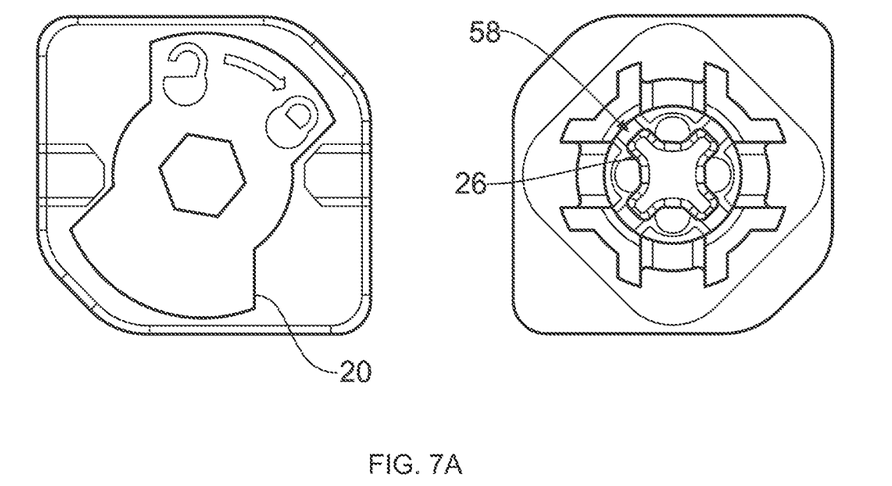
FIGS. 7A-7B show a top and bottom view of a schematic illustration of the installed rivet fastener assembly when moving the locking element (or pin) between FIG. 7A a locked position and FIG. 7B an unlocked position.
Figure 7B:
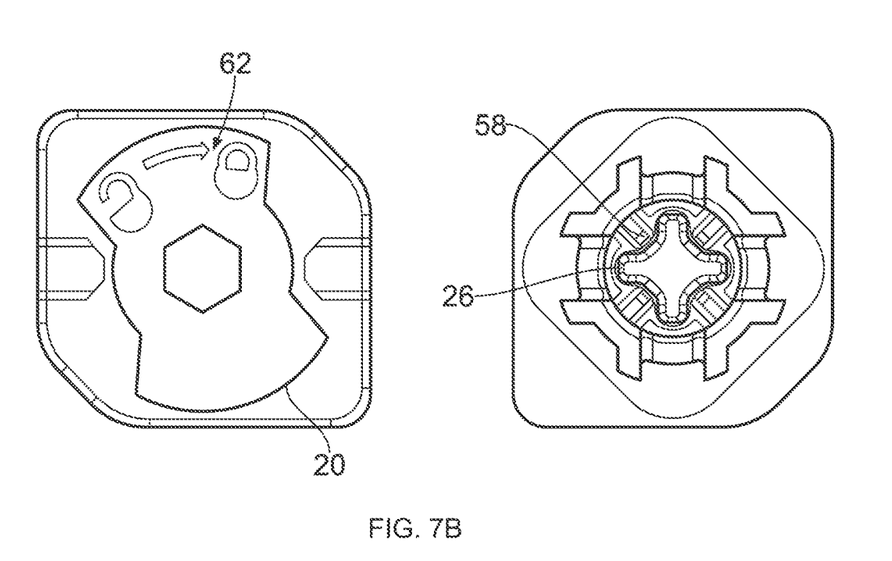

FIG. 4A illustrates a top-side view of the body 40. As shown, the head portion 42 has two stops 60 formed thereon which limit the rotation of the pin 20 within the body 40 by abutting the head 22 of the pin 20 when the pin 20 reaches a rotation limit, for example as shown in FIG. 7A. A first rotation limit shown corresponds to when the locking legs 24 of the pin 20 are engaged with corresponding ribs 56 formed on each retaining arm 46. Specifically, the rotation limit corresponds to when the ridges 28 on the locking legs 26 are engaged with the recess or slot 58 formed within each rib 56. This corresponds to the locked configuration of the fastener assembly 10. A second rotation limit corresponds to when the locking legs 26 of the pin 20 are disengaged from the retaining arms 46 which is the unlocked configuration of the fastener assembly 10, for example as shown in FIG. 7B. The head portion 42 has a central hole or aperture 62 formed therein for receiving the elongate portion 24 of the pin 20. As shown in FIGS. 4A and 4B, the hole 62 has a profile that corresponding to the profile of the elongate portion 24. This allows the elongate portion 24 to pass through while preventing the head 22 of the pin 20 from passing through.

Figure 5A:
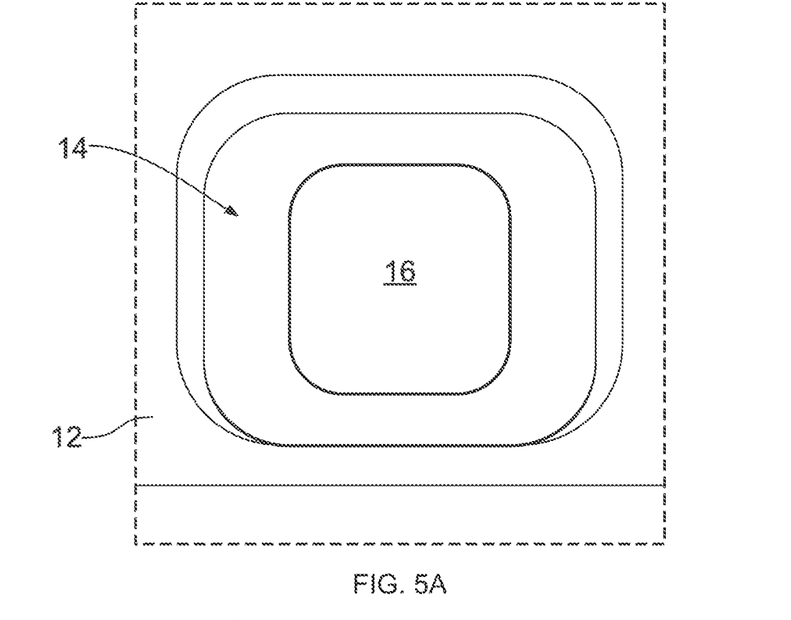
FIGS. 5A-5B illustrate a top view of FIG. 5A the mounting hole of a metal sheet and FIG. 5B the rivet fastener assembly installed into the mounting hole.
Figure 5B:
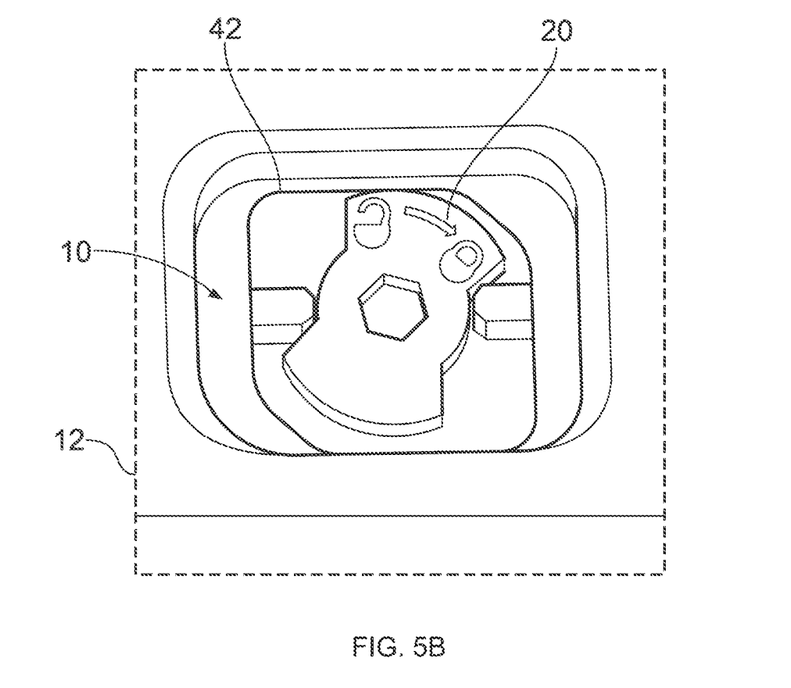
Figure 6A:
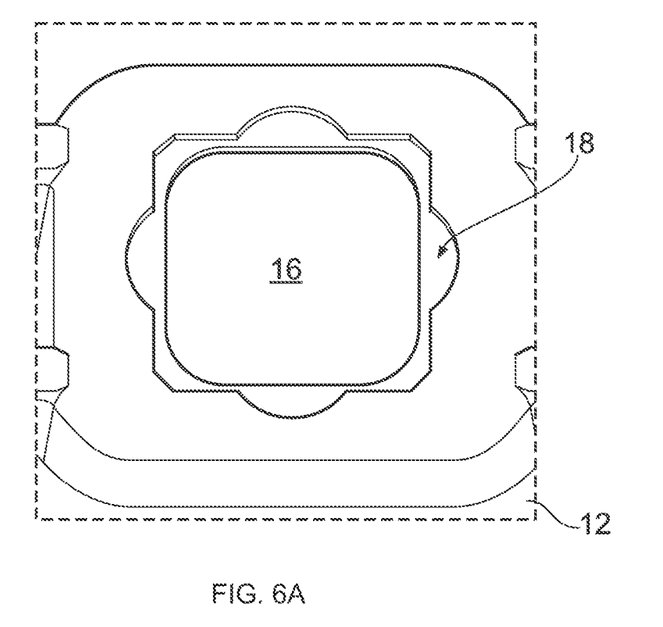
FIGS. 6A-6B illustrate a bottom view of FIG. 6A the mounting hole of a metal sheet and FIG. 6B the rivet fastener assembly installed into the mounting hole.

FIG. 5A illustrates a first panel 12, such as a plastic panel, having a recessed portion 14 and a hole or aperture 16 for receiving the fastener assembly 10. The hole 16 is formed within the recessed portion 14 of the panel 12 and is arranged such that the fastener assembly 10 is able to partially pass through the hole 16. As shown in FIG. 5B, when the fastener assembly 10 is assembled and mounted to the panel 12, the head portion 42 of the body 40 and the head 22 of the pin 20 are disposed on one side of the panel 12, while the retaining arms 46, intermediate plate 44 and elongate portion 24 are disposed on an other side of the panel 12. The arrangement illustrated in FIG. 5B may be considered as a pre-assembled panel. FIG. 6A illustrates an underside of the panel 12 and illustrates a second recess 18 formed in the underside of the panel 12.

Figure 6B:
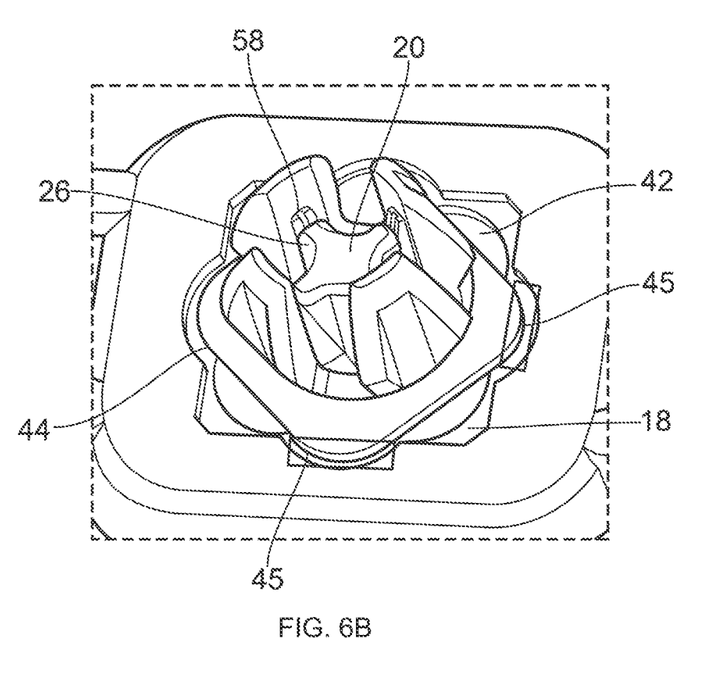

To prepare a pre-assembled panel, the fastener assembly 10 is inserted through the hole 16 until the head portion 42 of the body 40 abuts the panel 12 and the panel 12 is disposed between the intermediate plate 44 and the head portion 42. To secure the fastener assembly 10 to the panel 12 and prepare a pre-assembled panel, the fastener assembly 10 is rotated within the hole 16 until the panel 12 slides within the recess or space 50 formed between the intermediate plate 44 and the head portion 42. As shown in FIG. 6B, a rotation of a quarter turn, i.e. approximately 45 degrees, results in parts of the intermediate plate 44 pressing against or engaging with the second recess 18 of the panel 12. The parts of the intermediate plate 44 that engage with the second recess 18 may be considered as tabs 45 that secure the body 40 to the panel 12. The fastener assembly 10 is held in position due to the contour and shape of the mounting hole 16. This design allows a tolerance of +/−1 mm in both directions. While the fastener assembly 10 is rotated by an angle of approximately 45 degrees to be secured to the panel in FIG. 6B, it would be apparent this was not essential and that different profiles of the body 40 may correspond with other shapes of hole 16. Furthermore, it would be apparent that a pre-assembled panel may include a series of fastener assemblies 10 arranged in respective holes that are designed to fit with a second plate, for example, a metal plate 5. The pre-assembled panel may be subsequently pressed against the metal plate 5 and the retaining arms 46 of each of the fastener assemblies 10 may resiliently deform in order to pass through corresponding holes formed in the metal plate 5, such that the pre-assembled panel may be clipped onto the metal plate 5. An operator can then simply lock each of the fastener assemblies 10 to secure the metal plate 5 to the plastic panel 12 (see FIG. 7A).

In the locked configuration, the fastener assembly 10 is prevented from moving out of engagement with the panel 12 and/or metal sheet 5. When the pin 20 is in the unlocked position, the resilient retaining arms 46 could be bent towards the central axis of the fastener assembly 10, which allows the cross-sectional area defined by the outer periphery of the retaining arms 46 to reduce such that the body 40 slides through the hole of the metal plate 5. When the pin 20 is in the locked position, the resilient retaining arms 46 are prevented from deflecting inwards and towards the central axis of the fastener assembly 10, thereby retaining the cross-sectional area defined by the retaining arms 46 and preventing the fastener assembly 10 from dis-engaging with either of the plastic panel 12 and/or the metal sheet 5 (i.e. cannot slide through respective holes of the metal plate 5 and panel 12).

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible, for example, variations may exist in shape, size, arrangement (i.e. a single unitary components or two separate components), assembly or the like.

What is claimed is:

1. A fastener for fixing a sheet component, the fastener comprising:
    a body comprising a pair of resiliently deformable retaining arms arranged to extend axially through an opening in the sheet component during use, and
    a pin rotatably mounted within the body and comprising a pair of locking legs, the pin being rotatable between:
        an unlocked position, in which the retaining arms are deformable to pass through the opening in the sheet component, and
        a locked position, in which the locking legs engage the retaining arms to restrict deformation of the retaining arms and secure the fastener to the sheet component;
    wherein each of the retaining arms comprise a rib having a slot formed thereon, and wherein the slot is configured to receive a respective locking leg of the pin upon rotation of the pin to the locked position.

2. The fastener according to claim 1, wherein the body is configured to be attached to a further sheet component such that the fastener is for fixing the sheet component to the further sheet component.

3. The fastener according to claim 2, wherein the body comprises a head portion and a tab axially spaced from the head portion such that a portion of the further sheet component is receivable between the head portion and the tab so as to attach the fastener to the further sheet component.

4. The fastener according to claim 1, wherein the body comprises a hole having a first cross-sectional profile, wherein the locking legs define a second cross-sectional profile corresponding to the first cross-sectional profile, and wherein, in the unlocked position, the locking legs can pass through the hole for assembly of the fastener.

5. The fastener according to claim 1, wherein the pin further comprises at least one knob arranged to engage with the body when the pin is in the unlocked position, so as to retain the pin within the body in the unlocked position.

6. A fastening system comprising the fastener according to claim 1 secured in the sheet component with the pin in the locked position.

7. The fastener according to claim 1, wherein, for each retaining arm, the rib is located at a radially inward side of the retaining arm, and the slot is located at a radially inward side of the rib.

* * * * *